United States Patent
Alholm

(10) Patent No.: US 8,997,453 B2
(45) Date of Patent: Apr. 7, 2015

(54) IGNITER FOR A TURBOMACHINE AND MOUNTING ASSEMBLY THEREFOR

(75) Inventor: Hannes A. Alholm, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/537,461

(22) Filed: Jun. 29, 2012

(65) Prior Publication Data

US 2014/0000268 A1    Jan. 2, 2014

(51) Int. Cl.
   F02G 1/055    (2006.01)
   F02G 3/00    (2006.01)
   F02K 3/10    (2006.01)
   F02C 7/264    (2006.01)

(52) U.S. Cl.
   CPC . F02C 7/264 (2013.01); F02K 3/10 (2013.01); Y10T 29/49826 (2013.01)

(58) Field of Classification Search
   CPC ............ F02C 7/264; F02C 7/266; F02K 9/95; F23D 2207/00
   USPC .......................... 60/39.821–39.828, 761–766
   See application file for complete search history.

(56) References Cited

U.S. PATENT DOCUMENTS

| | | | |
|---|---|---|---|
| 2,742,755 A * | 4/1956 | Ivens et al. ...................... 60/241 |
| 2,798,360 A | 7/1957 | Hazen et al. | |
| 3,433,515 A * | 3/1969 | Rademacher ................... 403/28 |
| 3,487,636 A | 1/1970 | Vdoviak et al. | |
| 3,800,530 A | 4/1974 | Nash | |
| 4,765,136 A | 8/1988 | Clements et al. | |
| 5,026,223 A | 6/1991 | Hunt | |
| 5,385,015 A | 1/1995 | Clements et al. | |
| 5,979,387 A | 11/1999 | Strait et al. | |
| 6,363,898 B1 * | 4/2002 | Ripma et al. .............. 123/169 R |
| 6,438,940 B1 * | 8/2002 | Vacek et al. ..................... 60/204 |
| 7,168,236 B2 | 1/2007 | Schmotolocha et al. | |
| 7,712,315 B2 | 5/2010 | Hautman et al. | |
| 8,046,987 B2 | 11/2011 | Wilmot et al. | |
| 2004/0050061 A1 | 3/2004 | Schmotolocha et al. | |
| 2008/0098740 A1 * | 5/2008 | Roberts et al. .................. 60/765 |
| 2009/0199564 A1 | 8/2009 | Pieussergues et al. | |
| 2009/0235635 A1 * | 9/2009 | Ryan .......................... 60/39.821 |

OTHER PUBLICATIONS

International Search Report and Written Opinion for International Application No. PCT/US2013/043999 dated Mar. 18, 2014.
International Preliminary Report on Patentability for PCT Application No. PCT/US2013/043999, mailed Jan. 8, 2014.

* cited by examiner

Primary Examiner — Phutthiwat Wongwian
Assistant Examiner — William Breazeal
(74) Attorney, Agent, or Firm — Carlson, Gaskey & Olds, P.C.

(57) ABSTRACT

An exemplary igniter assembly for a turbomachine includes an igniter extending along an axis from an igniting end portion to an opposing end portion. The igniting end of the igniter is configured to be received within a bore of a tube. An annular seal restricts flow between the igniting end and the tube.

16 Claims, 4 Drawing Sheets

(12) United States Patent
US 8,997,453 B2

IGNITER FOR A TURBOMACHINE AND MOUNTING ASSEMBLY THEREFOR

BACKGROUND

This disclosure relates generally to an igniter and, more particularly, to mounting an augmentor igniter.

Turbomachines include igniters for igniting a mixture of fuel and compressed air. The mixture combusts when ignited. The products of combustion may be expanded over turbines. The products of combustion may be used to generate thrust from the turbomachines.

Some turbomachines include augmentors or "afterburners" to provide an increase in thrust. Within an augmentor section of a turbomachine, fuel is sprayed into a core stream of air. Igniters initiate combustion of the fuel and air to produce the desired additional thrust.

SUMMARY

An igniter assembly for a turbomachine according to an exemplary aspect of the present disclosure includes, among other things, an igniter extending along an axis from an igniting end portion to an opposing end portion. The igniting end portion of the igniter is configured to be received within a bore of a tube, and an annular seal restricts flow between the igniting end portion and the tube.

In a further non-limiting embodiment of the foregoing igniter assembly, the assembly may include a post biased against a stop to limit a withdrawal of the igniter from the bore.

In a further non-limiting embodiment of either of the foregoing igniter assemblies, the assembly may include a spring configured to bias the post.

In a further non-limiting embodiment of any of the foregoing igniter assemblies, the spring may be circumferentially disposed against a radially outwardly facing surface of the tube.

In a further non-limiting embodiment of any of the foregoing igniter assemblies, the post may extend radially from the igniter and may be received within a slot provided by the tube.

In a further non-limiting embodiment of any of the foregoing igniter assemblies, the slot may be a bayonet slot.

In a further non-limiting embodiment of any of the foregoing igniter assemblies, the igniter may comprise a steel core surrounding a ceramic insulating electrode.

In a further non-limiting embodiment of any of the foregoing igniter assemblies, the seal may be secured directly to a radially outwardly facing surface of the igniter.

In a further non-limiting embodiment of any of the foregoing igniter assemblies, the tube may extend radially away from an inner turbine exhaust case housing a pilot assembly.

In a further non-limiting embodiment of any of the foregoing igniter assemblies, the opposing end of the igniter may extend through an aperture provided by an outer turbine exhaust case.

In a further non-limiting embodiment of any of the foregoing igniter assemblies, the outer turbine exhaust case may permit movement of the igniter along the axis, and may restrict radial movement of the igniter relative to the axis.

In a further non-limiting embodiment of any of the foregoing igniter assemblies, the opposing end of the igniter may extend past the outer turbine exhaust case through an aperture provided by flange that is clamped to an outer duct assembly, the outer duct assembly may be outside the outer turbine exhaust case.

An augmentor assembly according to an exemplary aspect of the present disclosure includes, among other things, an inner turbine exhaust case, a collar extending radially from the turbine exhaust case, the collar configured to receive a radially inner end of an igniter, and an axial lock having a post that is biased against a slot wall to restrict axial movement of the igniter relative to the collar.

In a further non-limiting embodiment of the foregoing augmentor assembly, the assembly may include a spring positioned axially between a stop and post, the spring biasing the post against the slot wall.

In a further non-limiting embodiment of either of the foregoing augmentor assemblies, the stop may extend radially from the collar.

In a further non-limiting embodiment of any of the foregoing augmentor assemblies, the post may extend radially from the igniter.

In a further non-limiting embodiment of any of the foregoing augmentor assemblies, the assembly may include a seal configured to seal an annular gap between the igniter and the collar to block flow from the inner turbine exhaust case.

A method of securing an igniter within a turbomachine according to another exemplary aspect of the present disclosure includes, among other things, biasing a post against a slot wall to limit withdrawal of the igniter from a position suitable for igniting a pilot assembly of a turbomachine.

In a further non-limiting embodiment of the foregoing method of securing an igniter within a turbomachine, the method may include moving the igniter into a tube extending from a turbine exhaust case along an axis established by the igniter, and rotating the igniter about the axis to move the post into a circumferential position suitable for biasing.

In a further non-limiting embodiment of the foregoing method of securing an igniter within a turbomachine, the post may extend radially from an igniter that extends along an axis.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
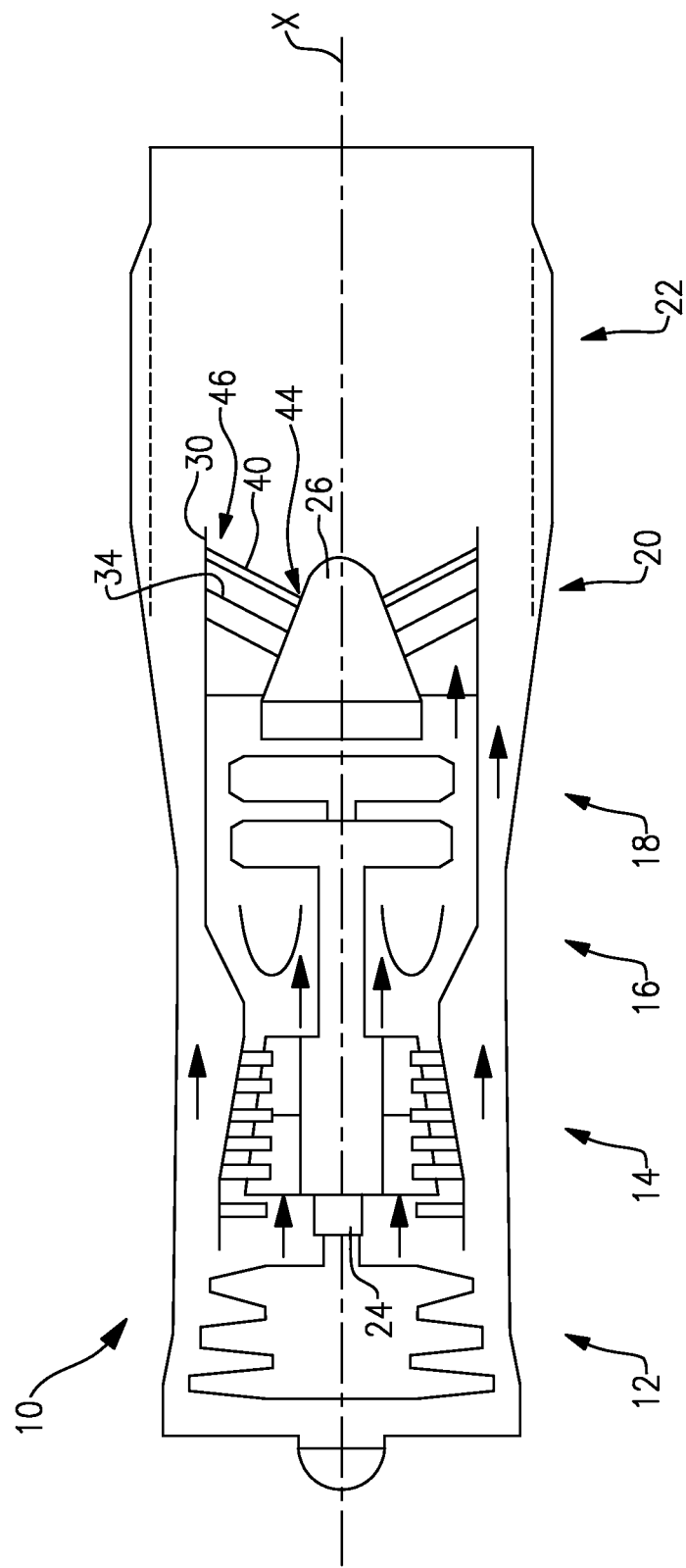
FIG. 1 is a schematic side view of an example turbomachine.

Referring to FIG. 1, an example turbomachine 10 includes a fan section 12, a compression section 14, a combustor section 16, a turbine section 18, an augmentor section 20, and an exhaust section 22. The compressor section 14, combustor section 16, and turbine section 18 are generally referred to as the core engine. The turbomachine 10 extends longitudinally along an axis X.

Although depicted as a two-spool gas turbine engine in the disclosed non-limiting embodiment, it should be understood that the concepts described herein are not limited to use with such two-spool designs. That is, the teachings may be applied to other types of turbomachines and gas turbine engines, including three-spool architectures.

In the example turbomachine 10, flow moves from the fan section 12 to a bypass flowpath. Flow from the bypass flowpath generates forward thrust.

The compressor section 14 drives flow along a core flowpath of the turbomachine 10. Compressed air from the compressor section 14 communicates through the combustor section 16. The products of combustion expand through the turbine section 18.

In some examples, the turbomachine 10 may incorporate a geared architecture 24 that allows a fan of the fan section 12 to rotate at a slower speed than a turbine that is driving the fan. The geared architecture 24 may include an epicyclic geartrain, such as a planetary geartrain, or some other gear system.

The augmentor section 20 of the example turbomachine 10 includes an inner turbine exhaust case 26, an outer turbine exhaust case 30, and an annular array of vanes 34 extending radially therebetween. Each of the vanes 34 houses a spraybar that supports a plurality of fuel injector assemblies at varied radial positions. The fuel injector assemblies introduce fuel to the augmentor section 20 as is known.

An igniter assembly 40 extends from the outer turbine exhaust case 30 to the inner turbine exhaust case 26. The igniter assembly 40 ignites a pilot assembly within the inner turbine exhaust case 26. The pilot assembly combusts the fuel introduced to the augmentor section 20 through the fuel injector assemblies.

Figure 2:
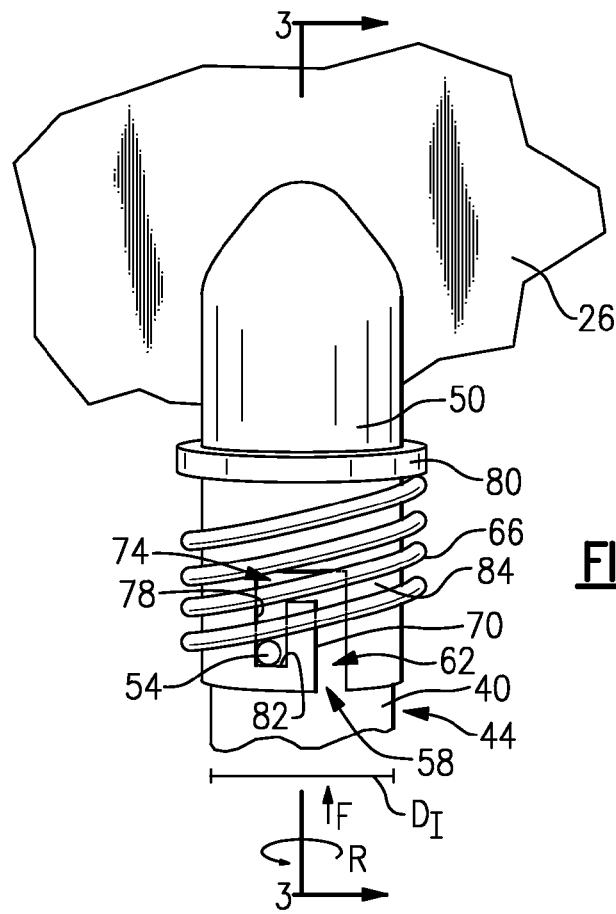
FIG. 2 shows an igniting end portion of an igniter assembly of the turbomachine of FIG. 1.
Figure 3:
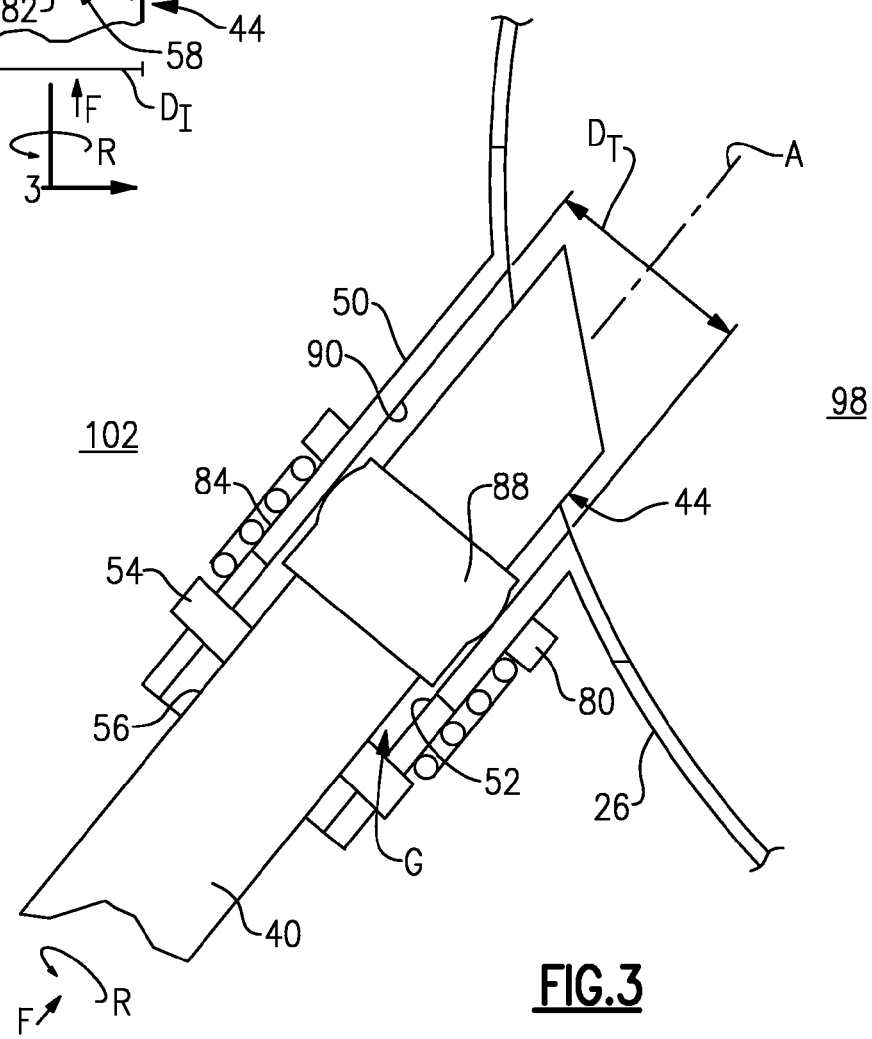
FIG. 3 shows a section view at Line 3-3 in FIG. 2.

Referring to FIGS. 2 to 3 with continuing reference to FIG. 1, the example igniter assembly 40 extends along an axis A from the inner turbine exhaust case 26 to the outer turbine exhaust case 30. The igniter assembly 40 extends along the axis A from an igniting end portion 44 to an opposing end portion 46. A igniting spark from the igniter propagates from the igniting end 44. The example igniter assembly 40 includes a steel core surrounding a ceramic insulating electrode.

In an installed position, the igniting end 44 of the igniter assembly 40 is received within a tube 50 (or collar) that extends from the inner turbine exhaust case 26 toward the outer turbine exhaust case 30. The tube 50 provides a bore 52 for receiving the igniter 40. The igniting end 44 is positioned within the bore 52 of the tube 50.

In this example, and with reference to the axis A, a post 54 extends away from a radially outer surface 56 of the igniter 40. To position the igniting end 44 in an installed position within the bore 52, the post 54 is first moved axially through an opening 58 of a slot 62 provided by the tube 50. The slot 62 has a "J" shape in this example. The slot 62 may be considered a bayonet slot.

The post 54 and the slot 62 together provide an axial lock. The example post 54 is shown extending from the igniter 40. In another example axial lock, an igniter may include the slot and a post may extend from the tube.

After sufficient movement along the axis A toward the radially inner turbine exhaust case 26, the post 54 contacts a spring 66. Sufficient force F is the applied to the igniter 40 to overcome the biasing force of the spring 66 and compress the spring 66. With sufficient compression of the spring 66, the post 54 moves axially past a wall 70 of the slot 62. The igniter 40 (and the post 54) are then rotated in a direction R about the axis A, which moves the post 54 through a circumferentially extending portion 74 of the slot 62. In this example, the post 54 is rotated circumferentially until the post 54 contacts a wall 78 of the slot 62.

The force F is then removed, which causes the spring 66 to move the igniter 40 axially out from the bore 52. In this circumferential position, the post 54 contacts a wall 82 of the slot 62 to limit movement of the igniter 40 out of the tube 50.

In this example, the spring 66 is a coil spring. One end of the spring 66 contacts a stop 80, and an opposing end of the spring 66 contacts the post 54. The spring 66 surrounds a radially outwardly facing surface 84 of the tube 50.

Fully withdrawing the igniter 40 from the tube 50 requires reapplying the force F so that the post 54 can be moved (against the biasing force of the spring 66) to a position suitable for rotating the post 54 through the circumferentially extending portion 74 of the slot 62 in a direction opposite the direction R. After moving the post 54 through the circumferentially extending portion 74, the post 54 can be withdrawn through the opening 58 and the igniter 40 removed from the tube 50.

The bore 52 has an inner diameter $D_T$ that is larger than an outer diameter $D_I$ of the igniter 40. There is also an annular gap G between the igniter 40 and the tube 50 to facilitate accommodating the igniting end 44 within the bore 52 when the igniting end 44 is received within the bore 52.

In this example, an annular seal 88 is secured to an outer surface of the igniter 40 and contacts an inner surface 90 of the tube 50 to prevent leakage through the gap G. The example seal may be of a piston ring design or an overlapping sheet-metal spring seal.

An area 98 within the inner turbine exhaust case 26 is at a lower pressure than an area 102 outside the inner turbine exhaust case 26. This pressure differential would cause flow to move through the gap G without the seal 88.

Figure 4:
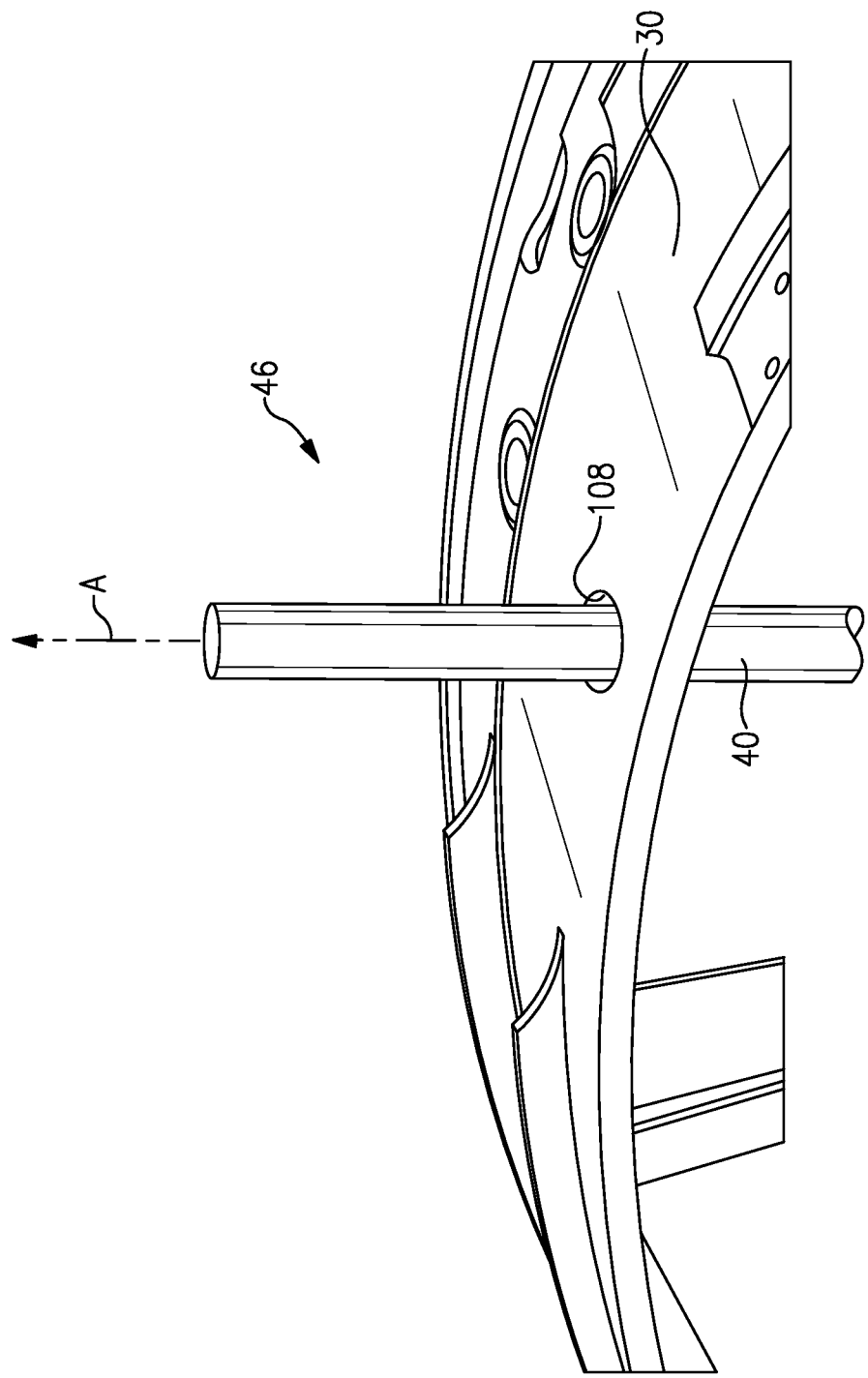
FIG. 4 shows an opposing end portion of the igniter assembly of FIG. 2.

Referring to FIG. 4, the opposing end portion 46 of the igniter 40 opposite the igniting end 44 extends through an aperture 108 in the outer turbine exhaust case 30. The interface between the outer turbine exhaust case 30 and the igniter 40 permits movement of the igniter along the axis A, while limiting radial movement of the igniter 40 relative to the axis A.

Figure 5:
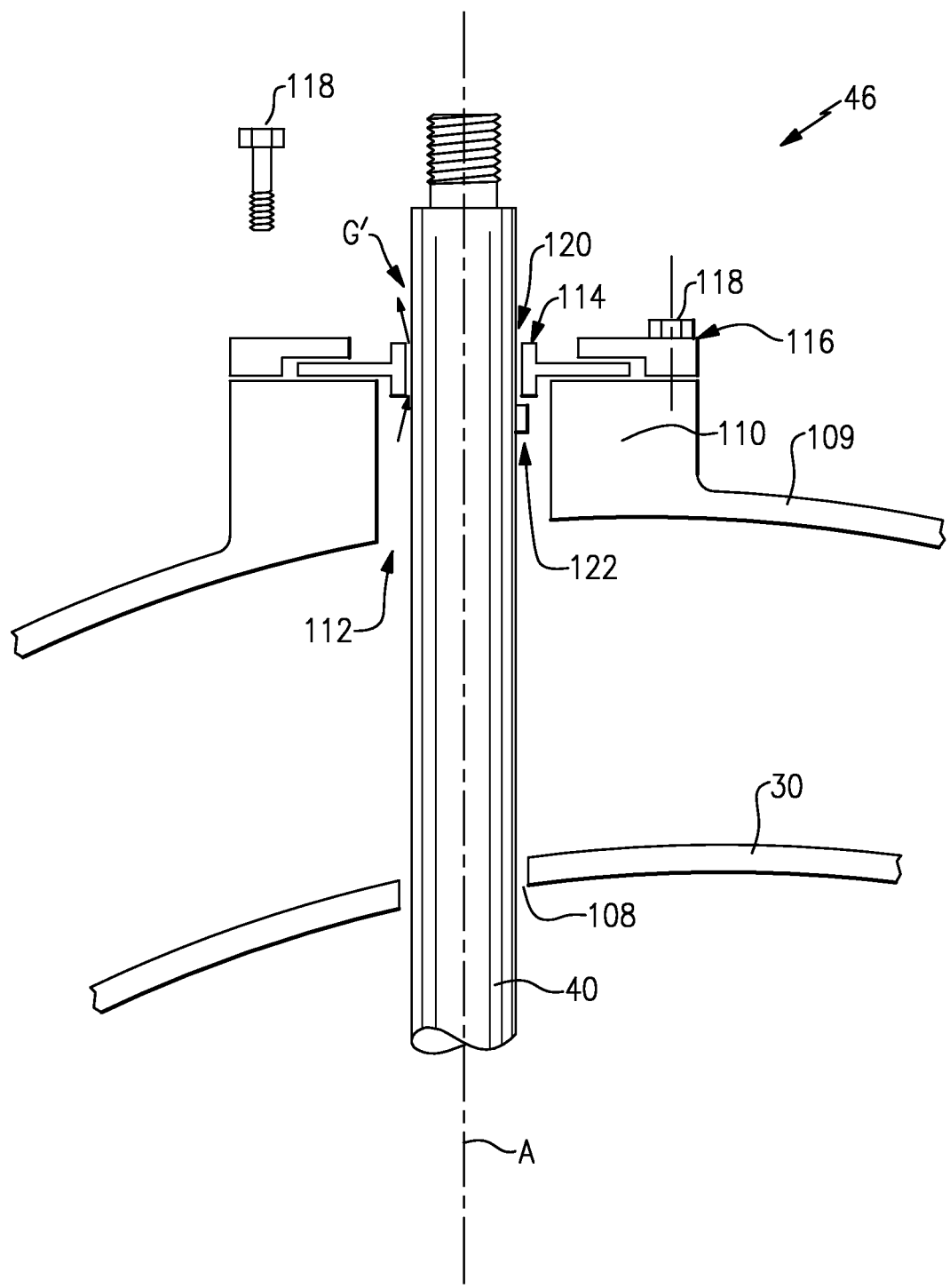
FIG. 5 shows another view of the opposing end portion interfacing with an outer duct assembly of the turbomachine.

Referring to FIG. 5, an outer duct assembly 109 is radially outside the outer turbine exhaust case 30. The opposing end portion 46 extends past the aperture 108 in the outer turbine exhaust case 30 to the outer duct assembly 109.

The outer duct assembly 109 includes a first, main flange 110 that provides an aperture 112. The main flange 110 is also referred to as a boss.

A bushing seal 114 is mounted to the main flange 110 with a second, clamping flange 116 and at least one mechanical fastener 118. The clamping flange 116 provides an aperture 120. The opposing end portion 46 extends past the outer turbine exhaust case 30 through the aperture 112 and the aperture 120. A diameter of the aperture 120 is slightly larger than a diameter of the opposing end portion 46. Thus, there is annular gap G' between the opposing end portion 46 and the clamping flange 114.

As the opposing end portion 46 moves radially relative to the outer duct assembly 109 due to, for example, relative thermal growth, the bushing seal 114 limits movement of air through the gap G' and also limits movement of the opposing end portion 46 radially relative to the axis A.

The opposing end portion 46 includes a raised flange 122 extending radially from the igniter 40 relative to the axis A. The raised flange 122 contacts the bushing seal 114 to limit with movement of the igniter 40 along the axis A relative to the outer duct assembly 109. Contact between the bushing seal 114 and the raised flange 122 also help to ensure that the igniter assembly 40 is captured if the post 54 or the wall 82 fail.

Features of the examples of this disclosure include an igniter that is mounted utilizing relatively few components and relatively lightweight components compared to prior art designs.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. An igniter assembly for a turbomachine, comprising:
an igniter extending along an axis in a first direction from an igniting end portion to an opposing end portion, wherein the igniting end of the igniter is configured to be received within a bore of a tube;
a post mounted on the igniter and extending radially through the tube;
a spring located radially outside the tube that biases the post in the first direction and that applies a force against the tube in a second direction opposite the first direction; and
an annular seal restricts flow between the igniting end and the tube.

2. The igniter assembly of claim 1, wherein the post is biased in the first direction away from a stop to limit a withdrawal of the igniter from the bore, the stop extending outwardly from the tube.

3. The igniter assembly of claim 1, wherein the spring is circumferentially disposed against a radially outwardly facing surface of the tube.

4. The igniter assembly of claim 1, wherein the post is received within a slot provided by a wall of the tube, the post extending completely through the wall to interface with the spring.

5. The igniter assembly of claim 4, wherein the slot is a bayonet slot.

6. The igniter assembly of claim 1, where in the seal is secured directly to a radially outwardly facing surface of the igniter.

7. The igniter assembly of claim 1, wherein the tube extends in the first direction away from an inner turbine exhaust case housing a pilot assembly.

8. The igniter assembly of claim 1, wherein the opposing end of the igniter extends through an aperture provided by an outer turbine exhaust case.

9. The igniter assembly of claim 8, wherein the outer turbine exhaust case permits movement of the igniter along the axis, and restricts radial movement of the igniter relative to the axis.

10. The igniter assembly of claim 8, wherein the opposing end of the igniter extends past the outer turbine exhaust case through an aperture provided by a flange that is clamped to an outer duct assembly, the outer duct assembly outside the outer turbine exhaust case.

11. The igniter assembly of claim 1, wherein the spring is circumferentially disposed about and around the tube.

12. An augmentor assembly, comprising: an inner turbine exhaust case;
a collar extending along an axis from the turbine exhaust case, the collar configured to receive a radially inner end of an igniter;
an axial lock having a post that is biased against a slot wall to restrict movement of the igniter relative to the collar along the axis; and
a spring positioned axially between a stop and a post, the spring biasing the post against the slot wall, wherein the stop extends radially outward from the collar.

13. The augmentor assembly of claim 12, wherein the post extends radially outward from the igniter.

14. The augmentor assembly of claim 12, including a seal configured to seal an annular gap between the igniter and the collar to block flow from the inner turbine exhaust case.

15. The augmentor assembly of claim 12, wherein the post extends through the collar.

16. The augmentor assembly of claim 15, wherein the spring is outside the collar.

* * * * *